(12) United States Patent
Messerschmidt et al.

(10) Patent No.: US 6,504,614 B1
(45) Date of Patent: Jan. 7, 2003

(54) INTERFEROMETER SPECTROMETER WITH REDUCED ALIGNMENT SENSITIVITY

(75) Inventors: Robert G. Messerschmidt, Huntington, CT (US); Russell E. Abbink, Albuquerque, NM (US)

(73) Assignee: Rio Grande Medical Technologies, Inc., Albuquerque, NM (US)

( * ) Notice: Subject to any disclaimer, the term of this patent is extended or adjusted under 35 U.S.C. 154(b) by 0 days.

(21) Appl. No.: 09/415,600

(22) Filed: Oct. 8, 1999

(51) Int. Cl.[7] ............................................... G01B 9/02
(52) U.S. Cl. ....................................................... 356/455
(58) Field of Search ................................. 356/455, 451, 356/456

(56) References Cited

U.S. PATENT DOCUMENTS

| | | | |
|---|---|---|---|
| 4,142,797 A | 3/1979 | Astheimer | 356/346 |
| 4,654,530 A | 3/1987 | Dybward | 250/347 |
| 4,684,255 A * | 8/1987 | Ford | 356/346 |
| 4,830,496 A | 5/1989 | Young | 356/363 |
| 4,975,581 A | 12/1990 | Robinson et al. | 250/339 |
| 5,243,404 A * | 9/1993 | Yoshikawa | 356/346 |
| 5,355,880 A | 10/1994 | Thomas et al. | 128/633 |
| 5,435,309 A | 7/1995 | Thomas et al. | 128/633 |
| 5,494,032 A | 2/1996 | Robinson et al. | 128/633 |
| 5,537,208 A | 7/1996 | Bertram et al. | 356/346 |
| 5,630,413 A | 5/1997 | Thomas et al. | 128/633 |
| 5,636,633 A | 6/1997 | Messerschmidt et al. | 128/633 |
| 5,655,530 A | 8/1997 | Messerschmidt | 128/633 |
| 5,792,050 A | 8/1998 | Alam et al. | 600/310 |
| 5,808,739 A * | 9/1998 | Turner et al. | 356/346 |
| 5,822,136 A | 10/1998 | Semrad et al. | 359/818 |
| 5,823,951 A | 10/1998 | Messerschmidt | 600/322 |
| 5,830,132 A | 11/1998 | Robinson | 600/310 |
| 5,857,462 A | 1/1999 | Thomas et al. | 128/633 |
| 5,935,062 A | 8/1999 | Messerschmidt et al. | 600/322 |

FOREIGN PATENT DOCUMENTS

| | | |
|---|---|---|
| EP | 0 449 335 A2 | 10/1991 |
| EP | 0 681 166 A1 | 11/1995 |
| EP | 0 836 083 A1 | 4/1998 |

OTHER PUBLICATIONS

Brasunas John C. et al., "Uniform Time–Sampling Fourier Transform Spectroscopy," *Applied Optics*, vol. 36, No. 10, Apr. 1, 1997, pp. 2206–2210.

Brault, James W., "New Approach to High–Precision Fourier Transform Spectrometer Design," *Applied Optics*, vol. 35, No. 16, Jun. 1, 1996, pp. 2891–2896.

(List continued on next page.)

*Primary Examiner*—Frank G. Font
*Assistant Examiner*—Phil Natividad
(74) *Attorney, Agent, or Firm*—Crompton, Seager & Tufte, LLC

(57) ABSTRACT

An interferometer spectrometer that has reduced alignment sensitivity is described herein. Parallelism of an output ray pair formed by a single input ray is not affected by variations in relative alignment of the components. In comparison to other compensated interferometer designs, lateral separation errors in the output ray pair due to optical component misalignment are reduced. The reduced alignment sensitivity may be accomplished by utilizing simple planar components that are common to both light paths. The reduced alignment sensitivity and simplicity in design provides a more compact and more robust interferometer, with reduced manufacturing costs associated therewith. An elliptical field of view light source that utilizes an array of collimator lenses is also described. The light source provides a more compact design than a single circular collimator lens of the same area, and is suitable for single channel or multi-channel use.

63 Claims, 5 Drawing Sheets

OTHER PUBLICATIONS

Despain, Alvin M. et al., "A Large–Aperture Field–Widened Interferometer–Spectrometer for Airglow Studies," Aspen International Conference on Fourier Spectroscopy, 1970, pp. 293–300.

Mertz, Lawrence, *Transformation in Optics*, John Wiley & Sons, Inc. (1965) pp. 50–51.

Offner, A., "New Concepts in Projection Mask Aligners," *Optical Engineering*, vol. 14, No. 2, Mar.–Apr. 1975, pp. 130–132.

Steel, W.H., "Interferometers for Fourier Spectroscopy," Aspen International Conference on Fourier Spectroscopy, (1970) pp. 43–53.

Sternberg R.S. et al., "A New Type of Michelson Interference Spectrometer," *Sci. Instrum.*, vol. 41 (1964) pp. 225–226.

Tipler, Paul A., *Physics, Second Edition*, Worth Publishers, Inc., Chapter 34, Section 34–2, Nov. 1983, pp. 901–908.

* cited by examiner

INTERFEROMETER SPECTROMETER WITH REDUCED ALIGNMENT SENSITIVITY

FIELD OF THE INVENTION

The present invention is generally related to interferometers. Specifically, the present invention is related to interferometers for use as spectrometers, such as Fourier transform spectrometers.

BACKGROUND OF THE INVENTION

Interferometers have historically enjoyed a wide variety of applications for analyzing material properties. For example, as incorporated in a Fourier transform spectrometer, an interferometer may be used in the medical field to detect and measure various constituents of body tissues and fluids. Interferometer spectrometers are particularly useful in the medical field because they allow for relatively non-invasive measurement techniques, as compared to prior art techniques which require tissue and/or fluid sampling by physically removing the sample from the patient.

The ability to perform relatively non-invasive procedures in the measurement of body tissue and/or fluid characteristics provides a tremendous advantage over the relatively invasive procedures of the prior art. For example, U.S. Pat. No. 5,830,132 to Robinson describes a robust and accurate non-invasive analyte monitor utilizing a light dispersion device such as an interferometer spectrometer for the measurement of blood constituents including glucose, alcohol, BUN (blood urea nitrogen), bilirubin, hemoglobin, creatin, cholesterol, and electrolytes. Another example of a non-invasive analyte monitor is disclosed in U.S. Pat. No. 5,655,530 to Messerschmidt. The system and method of Messerschmidt '530 utilizes spectrographic techniques in conjunction with an improved optical interface. As applied to the measurement of blood glucose levels, the analyte monitors disclosed in Messerschmidt '530 and Robinson '132 provide a diabetic patient with the opportunity to greatly improve control of the disease by more frequent or even continuous glucose monitoring, which translates into a reduction in diabetic related complications, an increase in patient comfort, an increase in life expectancy, and an overall improvement in daily life coping with the disease.

Continuous or at least more frequent glucose monitoring is achieved by eliminating the necessity to obtain a blood or other fluid sample. Practically speaking, a blood sample may not be obtained on a continuous basis nor at a sufficient frequency due to obvious reasons associated with risk of infection, patient discomfort, and patient lifestyle. The analyte monitors disclosed in Messerschmidt '530 and Robinson '132 overcome these obstacles by providing a non-invasive and painless means to measure blood glucose levels, thereby eliminating risk of infection and patient discomfort.

From the foregoing, it is apparent that interferometer spectrometers may have a significant impact on continuing efforts to improve the health of chronically ill patients, such as diabetics, by providing a significant improvement over prior art systems and methods of analyzing bodily tissues and/or fluids. However, this and many other applications require, for practical purposes, a relatively compact and robust interferometer. Specifically, a practical application of an interferometer spectrometer requires that the interferometer be compact such that it is portable and robust such that it is able to withstand the abuse of everyday use. Unfortunately, the prior art interferometers are, relatively speaking, neither sufficiently compact nor sufficiently robust to provide a practical interferometer spectrometer for portable use.

Probably the most famous interferometer design is the Michelson interferometer, which is commonly used for Fourier transform spectroscopy. A form of Michelson interferometer commonly used for Fourier transform spectroscopy includes six (6) basic components, namely, a collimated light source, a beam splitter, a compensator, a fixed flat end mirror, a movable flat end mirror, and a light detector. The movable end mirror may be translated along an axis perpendicular to its surface to generate a series of optical path length differences (OPD) used to measure the spectral properties of the light.

In use, light emitted from the light source strikes the beam splitter, which partially reflects and partially transmits the light therethrough. The reflected beam travels to the movable mirror and is reflected back through the beam splitter toward the detector. The transmitted beam travels through the compensator plate (same thickness and material as the beam splitter plate) to the fixed end mirror and is reflected back through the compensator plate, reflected off of the beam splitter and toward the light detector.

As mentioned previously, the movable mirror may be translated back and forth with a finely calibrated screw adjustment, or the like, to generate an optical path length difference (OPD) or cause retardation such that the recombined beam forms an interference pattern, commonly referred to as an interferogram. Retardation is the OPD between a pair of output rays originating from a single input ray. By observing the interference pattern, and measuring the distance the movable mirror is translated, the wavelength of the light provided by the light source may be determined. Further, changes in wavelength may be measured to determine the index of refraction of test samples which may then be used to identify the material and characteristics of the test sample. Further yet, by observing the interference pattern at various wavelengths, the amount of light absorbed by test sample may be measured, which is indicative of the material and properties of the test sample.

Although the Michelson interferometer is extremely useful, it tends to be relatively sensitive to alignment of its various components. In particular, a tilt error is created by a change in the angle of the beam splitter, the fixed-end mirror, or the movable-end mirror relative to the other components. Tilt error may be defined as a deviation from strict parallelism of a pair of output rays originating from a single input ray. The effect of a tilt error is to reduce the modulation efficiency of the interferometer, in a wavelength dependent manner, causing a spectral calibration error. For example, a change in angle of an end mirror, corresponding to an edge displacement (relative movement of opposite edges of the end mirror) by less than five percent (5%) of the wavelength of the light, causes an unacceptable change in calibration of the interferometer. This type of alignment sensitivity is particularly difficult to eliminate with regard to the movable end mirror.

Attempts have been made, with limited success, to eliminate the tilt error of the Michelson interferometer by replacing the flat end mirror with retroreflectors as described by W. H. Steel, "Interferometers for Fourier Spectroscopy," Aspen International Conference on Fourier Spectroscopy, pp. 43–53 (1970). Although replacing the flat end mirrors with retroreflectors, such as cube-corner type or "cat's-eye" type retroreflectors, eliminate tilt error, a shear error may be caused by the lateral displacement of either retroreflector or a tilt of the beam splitter. Shear error is the lateral displacement of one light path relative to the other light path which causes a wavelength dependent reduction in the modulation efficiency of the interferometer. Shear error may be defined as a lateral separation of a pair of parallel output rays originating from a single input ray when the optical path difference (OPD) between the two rays is zero. Even a relatively small shear error on the order of a few wavelengths of light may be detrimental to the calibration of the interferometer.

Other attempts have been made to improve on the Michelson interferometer design in an effort to reduce alignment sensitivity of the components. For example, the Folded Jamin design provides a relatively stable design utilizing a relatively thick beam splitter plate and a rocking mirror as described by L. Mertz, "Transformations in Optics," page 50 (1965). Although the Folded Jamin design reduces component alignment sensitivity, an exact ray trace analysis of the design demonstrates that the allowable field of view (FOV) is relatively small, particularly as compared to the FOV of the Michelson interferometer. A relatively small FOV renders the Jamin interferometer unsuitable for Fourier transform spectroscopy, particularly when the signal-to-noise ratio must be optimized through the use of a light source of a large angular subtense.

Further attempts have been made to reduce the alignment sensitivity of the Michelson interferometer by rotating the interferometer components as a group to generate the OPD. For example, U.S. Pat. No. 4,684,255 to Ford and the article by R. S. Sternberg and J. F. James "A New Type Of Michelson Interference Spectrometer," *J. Sci. Instru.,* Vol. 41 (1964) pp. 225–226, describe interferometers wherein the OPD is generated by rotating four components as a group. Another example is disclosed in U.S. Pat. No. 5,537,208 to Bertram et al. which describes an interferometer wherein the OPD is generated by rotating two mirrors in parallel. Although tilt error and shear error are eliminated by these designs to the extent that the components are rotated as a group with no relative movement therebetween, tilt and shear error may be caused by an incorrectly positioned component as constructed. As such, these designs inherently rely on the precise positioning and mounting of the components, as constructed and maintained thereafter, to eliminate tilt and shear error. For example, European Patent Application 0681166 A1 proposes the use of optically flat and parallel spacers to establish optical contact between the critical components and thereby maintain the precise position of the components. However, such component mounting techniques are relatively costly to implement.

In sum, many of the interferometer spectrometers proposed in the prior art are sensitive to relative alignment between the critical components, and thus are susceptible to tilt error and/or shear error. Attempts to reduce the alignment sensitivity of the various components have been met with limited success. Specifically, interferometer spectrometers of the prior art that reduce tilt and/or shear error have done so by compromising other performance aspects of the design and by increasing manufacturing costs.

SUMMARY OF THE INVENTION

The interferometer spectrometer of the present invention reduces alignment sensitivity of the critical components without compromising performance or increasing manufacturing costs. Specifically, as compared to the Michelson interferometer, the interferometer of the present invention does not produce tilt error due to relative tilting of the components. As compared to the modified Michelson interferometer utilizing retroreflectors, the interferometer spectrometer of the present invention greatly reduces shear error due to tilting or lateral movement of any of the components. In addition, as compared to the Jamin interferometer, the interferometer spectrometer of the present invention provides a much larger FOV. Further, as compared to the component group rotation interferometers, the interferometer spectrometer of the present invention eliminates tilt and shear sensitivity of the individual components, as opposed to groups of components, thereby providing a more stable design with less complex and lower-cost component mounting techniques. Further yet, as compared to prior art interferometer spectrometers that are field-widened, the interferometer spectrometer of the present invention is field-widened without introducing the possibility of tilt and/or shear error.

The present invention overcomes the disadvantages of the prior art by providing an interferometer spectrometer that has reduced alignment sensitivity. In particular, variations in relative alignment (angular or translational displacement) do not adversely affect the parallelism (i.e., tilt error) of the recombined output ray pair, and thus do not result in calibration error. In addition, translational variations in relative alignment do not change the separation (i.e., shear error) of the output ray pair, and thus do not result in calibration error. Furthermore, rotational variations in relative alignment produce very little separation (i.e., shear error) of the output ray pair, and thus reduce sensitivity to mounting alignment and stability tolerances as compared to a Michelson interferometer with cube-corner or "cat's-eye" retroreflectors. The reduced alignment sensitivity may be accomplished by utilizing simple planar components that are common to both light paths. The reduced alignment sensitivity and simplicity in design provides a more compact and more robust interferometer, with reduced manufacturing costs associated therewith.

In an exemplary embodiment of the present invention, the interferometer spectrometer includes a beam splitter, a means for redirecting the split back toward the beam splitter, and a means for generating a path length difference (OPD) between the split rays. Both of the split rays optically interact with each of the beam splitter, the redirecting means, and the means for generating a path length difference, thereby reducing alignment sensitivity. The split rays are recombined by the beam splitter to form an output ray pair, wherein the rays forming the output ray pair are parallel. The interferometer may include a compensator, and the path length difference generating means may comprise rotation of the beam splitter, the redirecting means, or the compensator.

With this arrangement, translational and rotational changes in relative position between the beam splitter, the redirecting means, and the means for generating a path length difference do not result in a lack of parallelism between the rays forming the output ray pair. Further, translational changes in relative position between the beam splitter, the redirecting means, and the means for generating a path length difference do not result in a lateral separation of the rays forming the output ray pair. Further yet, there is no lateral separation of the rays forming the output ray pair when the first and second rays strike the end mirror at normal incidence.

In another exemplary embodiment of the present invention, the interferometer spectrometer includes a beam splitter, an end mirror and a means for generating an optical path length difference (OPD). The interferometer may also include a compensator and a scanner plate disposed between the beam splitter and the end mirror. The beam splitter causes an input ray to be split into a first ray and a second ray having a first path and a second path, respectively. The end mirror terminates the first and second paths to define a first path length and a second path length, respectively. The end mirror also reflects the first and second rays back to the beam splitter to combine the rays into an output ray pair. The OPD generating means causes a difference between the first and second path lengths to create varying amounts of constructive or destructive interference between the two output rays. The OPD may be generated by rotating the beam splitter, the compensator, or the scanner plate. The output ray pair has a substantial degree of parallelism, which is independent of variations in the relative translational or angular position of the components and a separation which is independent of variations in the relative translational position of the components. Preferably, both the first and second rays are common to the beam splitter and the compensator, and both rays reflect off one end mirror. The beam splitter and the compensator each preferably have a simple planar geometry such that the first and second rays are parallel to each other after passing therethrough.

In yet another exemplary embodiment of the present invention, the light source for an interferometer spectrometer produces an elliptical angular subtense. The elliptical angular subtense light source of the present invention provides an interferometer spectrometer having an increased throughput relative to an interferometer utilizing a light source of circular angular subtense. The light source may include a single collimator lens or an array of collimators lenses each having an array of transmitting fibers disposed adjacent an array of receiving fibers. The array of collimator lenses provides a more compact design than a single circular collimator lens of the same area, and is suitable for single channel or multi-channel use.

DETAILED DESCRIPTION OF THE INVENTION

The following detailed description should be read with reference to the drawings in which similar elements in different drawings are numbered the same. The drawings, which are not necessarily to scale, depict illustrative embodiments and are not intended to limit the scope of the invention.

Figure 1:
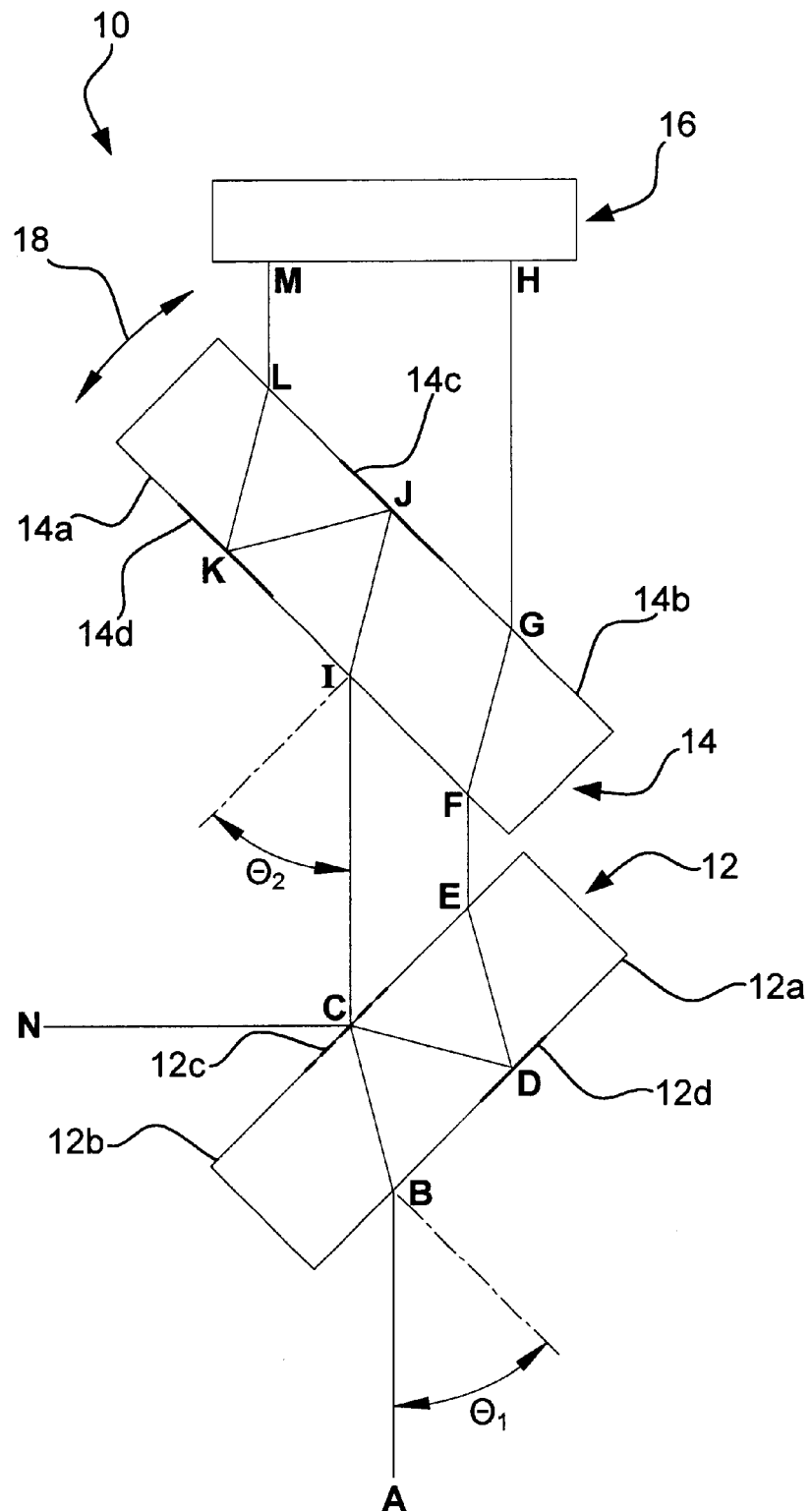
FIG. 1 is a schematic diagram illustrating a first embodiment of an interferometer in accordance with the present invention.

Refer now to FIG. 1, which illustrates a schematic diagram of an interferometer 10 for use as an interferometer spectrometer, particularly a Fourier transform spectrometer. The interferometer 10 provides a compact and stable design that is relatively insensitive to small alignment errors of the various components. Such a compact and stable design has been shown to be particularly useful when incorporated into a spectrometer used for near infrared non-invasive measurement of blood glucose and other blood analytes in humans, as described in Messerschmidt '530 and Robinson '132, the entire disclosures of which are hereby incorporated by reference. Although described with reference to an interferometer spectrometer used for non-invasive blood glucose measurement, the interferometers described herein are equally suitable for other applications requiring a spectrometer having a spectral calibration function insensitive to component alignment error.

Interferometer 10 includes three basic optical components, namely beam splitter 12, compensator plate 14, and end mirror 16. Those skilled in the art will recognize that through proper selection of materials, dimensions, and tolerances of the various components, the interferometer 10 may be utilized for all wavelengths, from ultraviolet to longwave infrared. Generally, as used herein, an optical component may comprise a homogenous piece of optical material which may be uncoated or coated on various parts of its surfaces with an anti-reflective coating, a reflective or mirror coating, or a beam splitter coating. Also as used herein, a single optical group may be used to describe an assembly of optical components. Those skilled in the art will recognize that some of the optical components discussed herein have known functional substitutes that are not mentioned for purposes of brevity only.

A light source (not shown) provides an input ray at point A, and a light detector (not shown) collects an output ray at point N. Although it is preferred to have a light source provide an input ray at point A and have a light detector collect the output ray at point N, the light source and the light detector may be switched. In particular, a light source may provide an input ray at point N, and a light detector may collect the output ray at point A. Furthermore, those skilled in the art will recognize that light may be introduced and collected at the same point, either A or N, by utilizing a means to prevent interference between the introduced light and the collected light. For example, the light source and the light detector may be moved off axis in equal and opposite directions so that the input ray is separated from the output ray by a small angle.

As stated previously, the interferometer 10 includes a beam splitter 12 and a compensator 14. The beam splitter 12 is an optical component which has as one of its functions the splitting of an input ray into two different paths. The beam splitter 12 comprises a plate having a leading edge or surface 12a and a trailing edge or surface 12b. The leading surface 12a is parallel to the trailing surface 12b. The beam splitter 12 comprises a homogenous refractive material which is transparent in the wavelength region of interest. Beam splitter 12 includes a partially reflective coating 12c deposited on a portion of the trailing surface 12b and a completely reflective coating 12d deposited on a portion of the leading surface 12a. The partially reflective coating 12c splits the input ray into two separate rays of approximately equal intensity, wherein one ray is transmitted and the other ray is reflected. The completely reflective coating 12d reflects all light striking it from within the plate 12.

The compensator 14 is an optical component which has as one of its functions the equalization of optical path length through the various refractive materials disposed in two optical paths. The compensator plate 14, similar to beam splitter 12, comprises a plate having a leading edge or surface 14a and a trailing edge or surface 14b. The leading surface 14a is parallel to the trailing surface 14b. The compensator plate 14 preferably comprises the same homogenous refractive material of preferably the same thickness as used in beam splitter plate 12, such that both beams are equally influenced by refraction. A completely reflective coating 14d is deposited on a portion of leading surface 14a and a completely reflective coating 14c is deposited on a portion of trailing surface 14b. Completely reflective coatings 14c and 14d reflect all light striking the coatings from inside the plate 14.

If the compensator plate 14 has a different thickness than beam splitter 12, the light rays will travel through different amounts of air and different amounts of refractive material. This difference in material results in phase error which manifests itself as an asymmetry in the interference pattern. To correct moderate amounts of phase error, which is wavelength dependent because the refractive index of the material varies as a function of wavelength, mathematical post processing techniques may be utilized. Such mathematical post processing techniques are known in the art, and thus the plate thickness of the compensator 14 relative to the beam splitter 12 need not be precisely equal.

End mirror 16 is a simple flat mirror arranged orthogonally with the input ray from the light source (not shown) such that the split rays are reversed in direction and travel back to the beam splitter to combine the split rays into an output ray pair. Preferably, the end mirror 16 is fixed and is common to both of the split rays. Utilizing one end mirror 16, as opposed to two end mirrors for each of the individual rays, simplifies the construction of the interferometer 10 and reduces the potential for alignment variations between the components. Those skilled in the art will recognize that a wide variety of means for redirecting the first and second rays back toward the beam splitter 12 may be used in place of end mirror 16. For example, the end mirror 16 could be replaced by a Porro prism, a V-mirror or a retroreflector (e.g., cat's eye or cube corner) to redirect the first and second rays back toward the beam splitter 12.

A Porro prism and a V-mirror are optical components including two perpendicular mirror surfaces. If a Porro prism or V-mirror is positioned such that the vertex (i.e., the line of intersection of the two mirror surfaces) is parallel to the line intersecting the first and second rays, then the system will function as with the flat end mirror 16, albeit with reduced FOV and a potential for shear error.

If a retroreflector is used as a replacement for the flat end mirror 16, preferably a single retroreflector is employed because the use of two retroreflectors may introduce the potential for shear error. A single retroreflector intercepting both the first and second rays may provide an interferometer with no tilt or shear error. For example, if the retroreflector is positioned well above or below the centerline of the axial rays such that all outgoing rays from the retroreflector are physically separated from the incoming rays, and the output rays pass through a complimentary (i.e., all components are flipped over to look like the mirror image of the components on the incoming side) system of a compensator, an OPD scanner and a beam splitter, then the interferometer may have no tilt or shear error.

For purposes of illustration only, a single ray trace is illustrated through the interferometer 10. Those skilled in the art will recognize that the interferometer 10 is suitable for both single channel and multichannel use by stacking the channels (i.e., rays) in a direction perpendicular to the plane of the illustration in FIG. 1. For ease of identification, the individual ray segments have been labeled with capital letters, starting with the input ray AB. Input ray AB enters the beam splitter plate 12 at leading surface 12a resulting in refracted ray BC. Refracted ray BC is then split into a first ray path initially defined by ray CD and a second ray path initially defined by ray CI.

Beginning with the first path, ray CD is reflected off reflective coating 12d on surface 12a to form ray DE. Ray DE is refracted at point E and enters the compensator plate 14 at point F on leading surface 14a. Ray EF is refracted at point F to form ray FG, which in turn is refracted at point G to form ray GH. Ray GH is reflected off mirror 16 and returns along the same path. Thus, the first path is defined by ABCDEFGH.

The second path, as initially defined by ray CI, enters compensator plate 14 through leading surface 14a at point I and is refracted to form ray IJ. Ray IJ is reflected off reflective coating 14c to form ray JK. Ray JK, in turn, is reflected off reflective coating 14d to form ray KL. Ray KL is refracted upon passing through trailing surface 14b at point L to form ray LM. Ray LM is reflected off of the end mirror 16 and returns is along the same path. Thus, the second path is defined by ABCIJKLM.

Utilizing the ray trace analysis provided above, a number of observations may be made about the interferometer 10. For example, each of the first and second rays optically interact with each of the optical components. As used herein, optically interact may be used to describe any condition where an optical ray interacts with an optical component to undergo reflection or refraction. By optically interacting with all of the components, the interferometer 10 has reduced alignment sensitivity for reasons set forth in more detail hereinafter.

Several other observations may be made by virtue of the ray trace analysis provided above. Assuming the leading surface 12a of the beam splitter 12 is parallel to the trailing surface 12b, rays EF and CI will be parallel, regardless of variations in angle between the beam splitter 12 and the input ray AB. Similarly, assuming the leading surface 14a of the compensator plate 14 is parallel to the trailing surface 14b, ray CI will be parallel to ray LM and ray EF will be parallel to ray GH. Further, ray GH will be parallel to ray LM independent of relative position between the beam splitter 12, the compensator plate 14 and the end mirror 16.

The first cumulative ray corresponding to the first path and the second cumulative ray corresponding to the second path are recombined at point C on the trailing surface 12b of the beam splitter 12 and emerge as an output ray pair comprising two rays in parallel. An output ray pair emerges as both ray BA and CN. The parallelism of the recombined rays is thus dependent only on the flatness and parallelism of the surfaces of the individual components of the interferometer 10. Specifically, the parallelism of the recombined rays is not dependent on variations in relative placement of one component relative to the other components of the interferometer 10. An error in parallelism between the two recombined rays would otherwise produce a wavelength dependent reduction in modulation efficiency of the interferometer 10, thus affecting instrument calibration. An error in parallelism between the individual rays forming the recombined ray pair is commonly referred to as tilt error.

Specifically, tilt error may be defined as the lack of parallelism between a pair of output rays (such as ray pair BA or ray pair CN) generated by one input ray (such as ray AB). The tilt error or angle between the rays forming the output ray pair, in the present invention, depends only on the angle between the two surfaces 12a and 12b of the beam splitter 12, the angle between the two surfaces 14a and 14b of the compensator plate 14 (if a compensator is utilized), and the flatness of all optical surfaces of the components comprising the interferometer 10. The two rays forming the output ray pair will be parallel if the two beam splitter 12 surfaces 12a and 12b are parallel, the two compensator plate 14 surfaces 14a and 14b are parallel, and all optical surfaces are flat. If these conditions are satisfied during the manufacture, mounting and assembly of the components, the result is zero tilt error, assuming the rays strike the intended surfaces of the components in the intended sequence, as illustrated. Because the parallelism of the recombined rays is independent of changes in placement of the components relative to each other, the interferometer 10 is fully tilt compensated.

The interferometer 10 of the present invention is also partially shear compensated. Shear error may be defined as the lateral separation of two parallel rays forming the output ray pair when the optical path length difference is zero. Lateral separation refers to separation in a direction perpendicular to the path of propagation of the output ray pair. Thus, when the tilt error is zero, shear error is the lateral separation between the individual rays forming the output ray pair. Zero shear error is accomplished when there is no lateral separation between the rays forming the output ray pair.

In the present invention, relative translational changes in position of the components comprising the interferometer 10 do not cause shear or affect shear error. Relative angular changes in position of the components of the interferometer 10 do affect shear error. However, relative to a Michelson interferometer with retroreflectors, relatively little shear error is introduced by angular changes in position of the components.

A properly adjusted Michelson interferometer with flat end mirrors will have zero shear error. However, as mentioned previously, such a Michelson interferometer is susceptible to tilt error absent the use of retroreflectors. On the other hand, a Michelson interferometer with cube-corner or "cat's-eye" retroreflectors to compensate for tilt error will have a large shear error equal to twice the lateral displacement of one of the retroreflectors from an optical center line established by the other retroreflector. By contrast, the interferometer 10 of the present invention, which is fully tilt compensated, has very little shear error.

Thus, the interferometer 10 is partially shear compensated relative to a Michelson interferometer with retroreflectors, thereby relaxing the translational and angular positional tolerance requirements of the components. Further, the interferometer 10 may be fully shear compensated by adjusting the end mirror 16 such that the output ray pair is parallel to the input ray, provided the two individual rays forming the output ray pair are parallel (i.e., zero tilt error). In this regard, the interferometer 10 of the present invention has exceptional interferometric optical tolerance. Interferometric optical tolerance may be defined as any rotational or transitional movement or surface irregularity that results in displacement of any part of the active optical area such that interferometer performance is affected. A reasonably good standard optical tolerance for interferometers is the distance equal to one-tenth (1/10) the wavelength of the shortest wavelength to be effectively measured by the interferometer.

Interferometer 10 may be used as a spectrometer by generating an interference pattern between the split rays. An interference pattern, i.e., an interferogram, is created by generating an optical path length difference (OPD) between the two paths, namely the first path ABCDEFGH and the second path ABCIJKLM. Since ray AB and ray BC are common to both paths, the OPD originates on the trailing surface 12b of the beam splitter 12 at point C.

Assuming the light source is provided at point A and the input ray AB forms an angle of incidence $\theta_1$ with surface 12a, and that the compensator plate 14 is positioned relative to the beam splitter 12 such that ray CI forms an incident angle $\theta_2$ equal to $\theta_1$, and further assuming that the end mirror 16 is positioned such that ray LM and ray GH strike the end mirror 16 at normal incidence, the optical path length CDEFGH is equal to the optical path length CIJKLM. Thus, the OPD under these conditions is zero at all wavelengths.

An OPD (other than zero) may be generated by rotating any one of the three primary components 12, 14, 16 of the interferometer 10 about the axis perpendicular to the plane of the drawing shown in FIG. 1. Preferably, the phase compensator plate 14 is rotated as indicated by arrow 18 because it is the only component for which both rays BA and CN (i.e., the recombined rays) do not change angle as the compensator plate 14 is rotated. It is desirable to avoid changing the angle of the recombined rays BA and CN such that the light source and light detector may remain stationary.

When the phase compensator plate 14 is rotated as indicated by arrow 18, a slight change in length of the optical path CDEFGH is encountered and a relatively large change in length of the optical path CIJKLM is encountered. The OPD with respect to path CDEFGH and path CIJKLM, which is proportional to the angle of rotation as indicated by arrow 18, is caused, in part, by changes in the angle of refraction and reflection through the compensator plate 14. Specifically, optical path CIJKLM encounters two reflections at points J and K resulting in a longer path through the compensator plate 14, and thus encounters a larger change in path length when the angle of the compensator plate 14 is changed. Accordingly, by subtracting path length CDEFGH from path length CIJKLM, a net path length difference is obtained which is proportional to the angle of rotation of compensator 14 as indicated by arrow 18.

Although the net path length difference change is proportional to the angle of rotation of the compensator plate 14, the OPD versus rotation angle will vary slightly as a function of wavelength due to the dispersive nature of the material of the compensator 14. Specifically, as the compensator plate 14 is rotated from the position where OPD equals zero, the path length through the refractive material of the compensator 14 increases in one direction of rotation and decreases in the other direction of rotation. This variation manifests itself by producing a slightly asymmetric interferogram, but is not considered a serious problem because it may be corrected by post processing of the data by known mathematical processing techniques.

Mathematical post processing techniques may also be utilized to compensate for differences in the amount of refractive material encountered by both light paths resulting from misalignment of the end mirror 16. Specifically, if the end mirror 16 is tilted such that ray LM and ray GH do not strike the mirror 16 at normal incidence, the phase compensator plate 14 must be rotated from the $\theta_2=\theta_1$ position to find the position where the OPD equals zero. However, by rotating the compensator plate 14 to account for misalignment of the end mirror 16, an unbalance in the equality of refractive material in both light paths is created. The unbalance of equality results in an optical path length difference that may be accounted for by post data processing, using known mathematical processing techniques, without affecting the calibration of the interferometer 10. Preferably, autocollimation techniques, as known to those skilled in the art, may be utilized to minimize the misalignment of the end mirror 16.

In use, the interferometer 10 generates an interferogram which is recorded by measuring the intensity of the light on the detector (not shown) at periodic intervals as the OPD is varied through a range of values depending on the required measurement resolution. The actual OPD must be known at each measurement position to within a small fraction of the wavelength of the light being measured. This is typically accomplished by simultaneously recording the interferogram of an auxiliary reference beam from a monochromatic source of accurately known wavelength, such as a HeNe laser. As applied to interferometer 10, such a reference beam may be placed adjacent to the test beam. Alternatively, the reference beam may be introduced at point N, assuming the test beam is introduced at point A, or visa versa. Further details on the use of the interferometer 10 as applied to an interferometer spectrometer used for non-invasive measurement of analytes, may be found in Messerschmidt '530 and Robinson '132.

Figure 2:
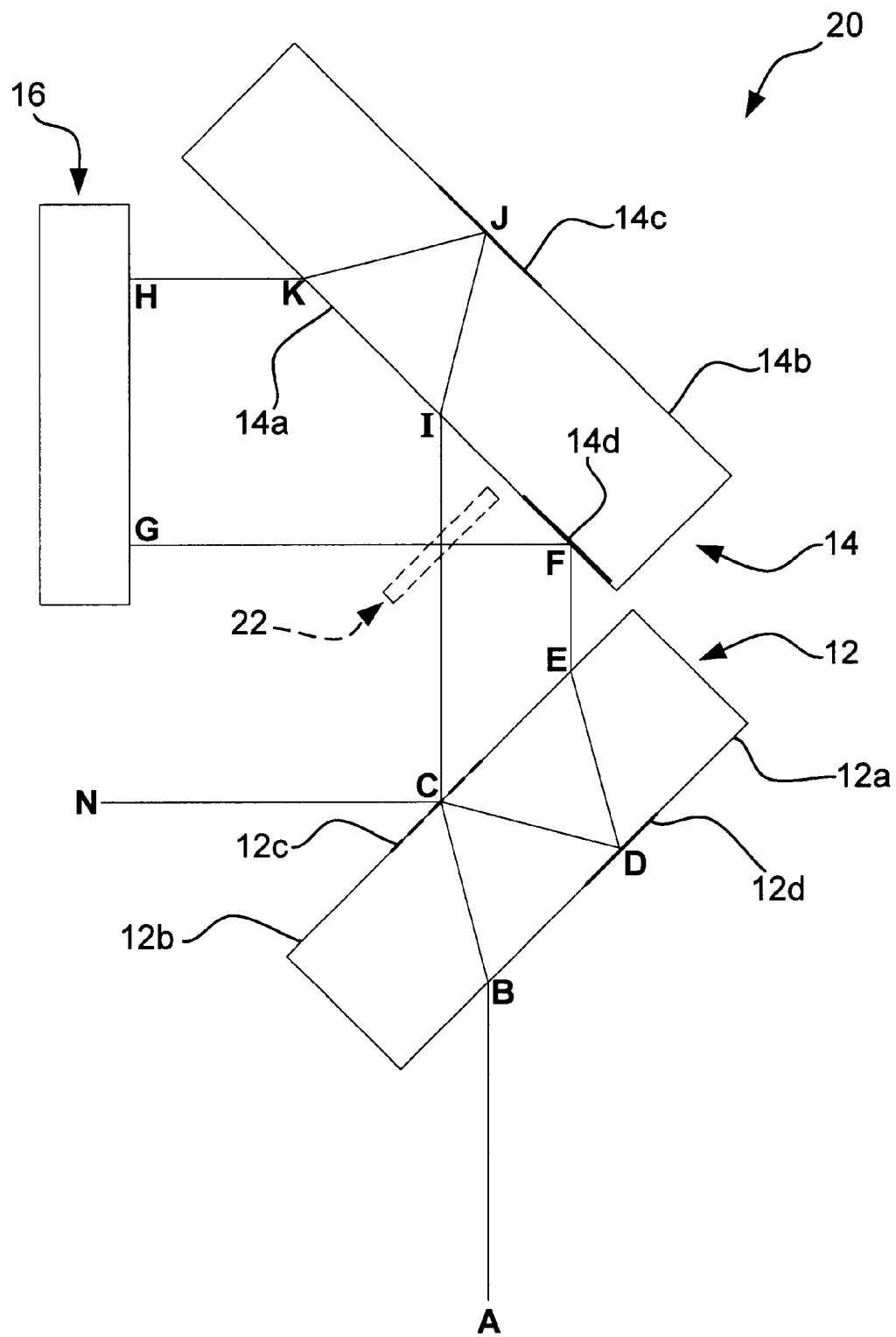
FIG. 2 is a schematic diagram illustrating a second embodiment of an interferometer in accordance with the present invention.

Refer now to FIG. 2, which illustrates a schematic diagram of an alternative interferometer 20 in accordance with another aspect of the present invention. Except as described hereinafter, interferometer 20 is the same in form and function as interferometer 10 described with reference to FIG. 1. With the rearrangement of the components of interferometer 20, the compensator plate 14 may have a smaller width for given collimated beam width as compared to interferometer 10.

In addition to the rearrangement of components, the interferometer 20 utilizes a compensator 14 having a slightly different arrangement of reflective coatings 14c and 14d. Interferometer 20 defines a first light path CDEFG and a second light path CIJKH. Ray CI is parallel to ray EF if the leading surface 12a of beam splitter 12 is parallel to the trailing surface 12b. Similarly, assuming that ray CI is parallel to ray EF, ray KH will be parallel to ray FG provided that leading surface 14a of compensator plate 14 is parallel to trailing surface 14b. As with interferometer 10, the return rays of interferometer 20 remain parallel independent of the position of the components relative to each other.

Also similar to interferometer 10, the beam splitter 12 or the compensator plate 14 of interferometer 20 may be rotated to generate the OPD. Alternatively, in order to avoid changing the angle of the output ray BA or CN, a scanner plate 22 (shown in phantom) may be provided. The scanner plate 22 comprises a thin plate of refractive material and is positioned approximately at the intersection of ray CI and ray FG. Rotation of the scanner plate 22 about an axis perpendicular to the plane of the drawing causes the amount of refractive material in one path to increase while decreasing the amount of refractive material in the other path. Thus, rotation of the scanner plate 22 causes an OPD. Under perfect alignment conditions, zero OPD is achieved when the angle of incidence of both light paths is equal. Variation in the incidence angle caused by rotation of the scanner plate 22 causes a corresponding and proportional change in OPD.

Scanner plate 22 may be positioned at the intersection of rays CI and FG as illustrated. Positioning the scanner plate at the intersection is not absolutely necessary, but allows the scanner 22 to be made very small. In addition, manufacturing defects tend to be canceled out if the scanner is common to both light paths, such as at the intersection of rays CI and FG. Further, commonality to both light paths provides more OPD change per change in angle of rotation of the scanner 22.

In addition to the advantage of maintaining a constant angle of the output ray BA or CN, utilizing the scanner plate 22 to generate the OPD provides the advantage of a symmetrical interferogram and rapid scanning. A symmetrical interferogram is achieved by eliminating differences in the amount of refractive material between the two light paths, other than as used to generate the OPD. The rapid scanning is achieved by virtue of the low mass of the scanner plate 22, which is relatively small as compared to the beam splitter 12 and the compensator plate 14. In addition, a very thin scanner plate 22 will produce a relatively small OPD change for a relatively large rotational angle change of the plate 22. Thus, by utilizing a very thin scanner plate 22, the desired scanning may be achieved by continuously rotating the plate 22. Furthermore, the relatively large angle change corresponding to the relatively small OPD change may eliminate the need for an OPD reference laser beam, which may be replaced by a relatively simple shaft rotary position encoder.

Figure 3:
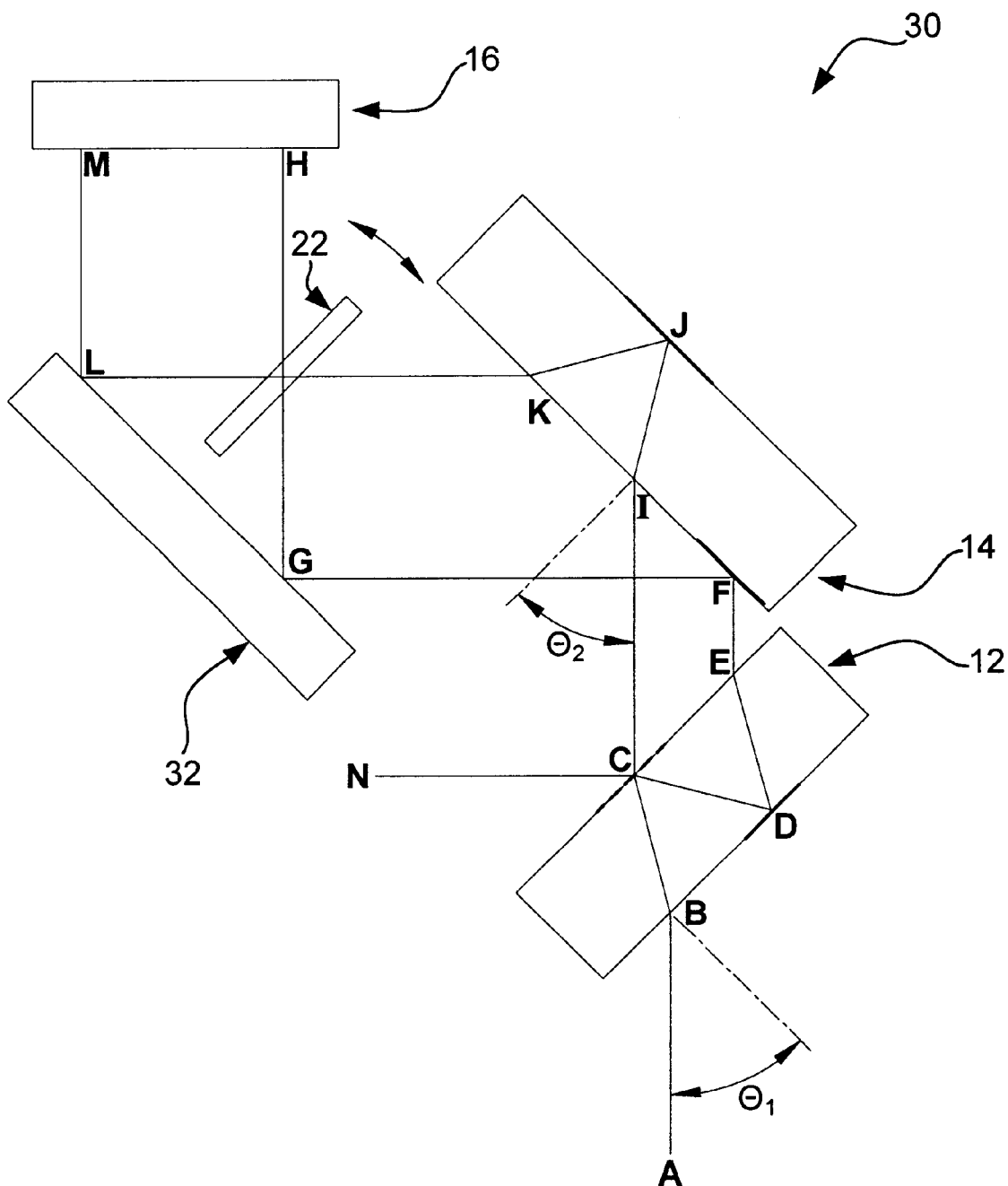
FIG. 3 is a schematic diagram illustrating a third embodiment of an interferometer in accordance with the present invention.

Refer now to FIG. 3, which illustrates a schematic diagram of an alternative interferometer 30 in accordance with yet another embodiment of the present invention. Except as described herein, interferometer 30 is the same in form and function as interferometer 20 described with reference to FIG. 2. Interferometer 30 has a slightly different arrangement of components to define a first light path CDEFGH and a second light path CIJKLM. In addition to the rearrangement of components, interferometer 30 includes mirror 32 which creates an additional intersection of the two light paths such that the scanner plate 22 may be repositioned. Thus, the space available to insert the refractive OPD scanner plate 22 is increased, without vignetting. In practice, this allows the beam splitter 12 and the phase compensator plate 14 to be made with reduced thickness, thereby reducing the overall size and cost of the interferometer 30, despite the use of an additional component, namely mirror 32.

In order to optimize the performance of the interferometer 30, a light source producing an elliptical angular subtense is preferred. A light source providing an elliptical angular subtense is described with reference to FIGS. 5A through 5C. This may be appreciated by performing a detailed ray trace analysis of the interferometer 30 which demonstrates that the allowable angular subtense, as compared to the Michelson interferometer, is much larger in a plane perpendicular to the drawing and somewhat smaller in a plane parallel to the drawing. The allowable angular subtense may be defined as the light source angular subtense for which the interferogram produced by a ray originating at the edge of the light source is 180 degrees out of phase with that of a ray originating from the center axis of the light source. The allowable angular subtense is measured at a specific wavelength, generally the shortest wavelength of interest at the maximum retardation. Maximum retardation is set by the spectral resolution requirement of the measurement.

The throughput of the interferometer 30 is proportional to the product of the two orthogonal angular subtense angles mentioned above. Throughput may be defined as the allowable solid angle of the light source, as viewed through the collimating lens, multiplied by the collimated beam area at the exit pupil of the collimating lens. In other words, optical throughput is the product of the light source area and the light source solid angle utilized by the interferometer. The allowable solid angle is calculated from the allowable angular subtense as defined above. Accordingly, the throughput of the interferometer 30 is moderately larger than the throughput of the Michelson interferometer. By increasing the throughput of the interferometer 30, the interferometer becomes field widened. A field-widened interferometer allows the use of a smaller diameter collimator lens while maintaining the required measurement signal-to-noise ratios. This is particularly useful when the interferometer 30 is adapted for multi-channel use.

For example, an analysis of a working model of interferometer 30 yielded an allowable angular subtense of 0.62 times that of the Michelson interferometer in a plane parallel to the drawing and 2.8 times that of the Michelson interferometer in a plane orthogonal to the drawing, resulting in a total throughput improvement of approximately 1.8 times that of the Michelson interferometer. To take advantage of this increased throughput, a light source providing an elliptical angular subtense is preferred. For example, in the working model of interferometer 30, elliptical angular subtense is preferred having a ratio of approximately 4.6:1 for the major and minor axes. Those skilled in the art will recognize that the exact values of these parameters depend on the construction parameters and the refractive index of the materials used.

As with interferometers 10 and 20 described with reference to FIGS. 1 and 2, respectively, interferometer 30 maintains parallelism of the output ray pair independent of the relative position of the components. Specifically, when ray AB is made parallel to ray BA by adjusting the end mirror 16, there is no sheer error, independent of the relative alignment of the other components. Although misalignment of the end mirror resulting in an angular difference between ray AB and ray BA introduces some shear at zero OPD, the amount of sheer introduced is relatively small as compared to a modified Michelson interferometer utilizing a cube-corner retro reflector. For example, an analysis of the working model of interferometer 30 revealed that when ray AB and ray BA were separated by approximately 3 degrees, the positional tolerance allowed for one of the phase compensator support points was about 30 times greater than that allowed for lateral displacement of a cube-corner or "cat's-eye" retroreflector. Accordingly, the interferometer 30 is relatively sheer compensated.

Figure 4:
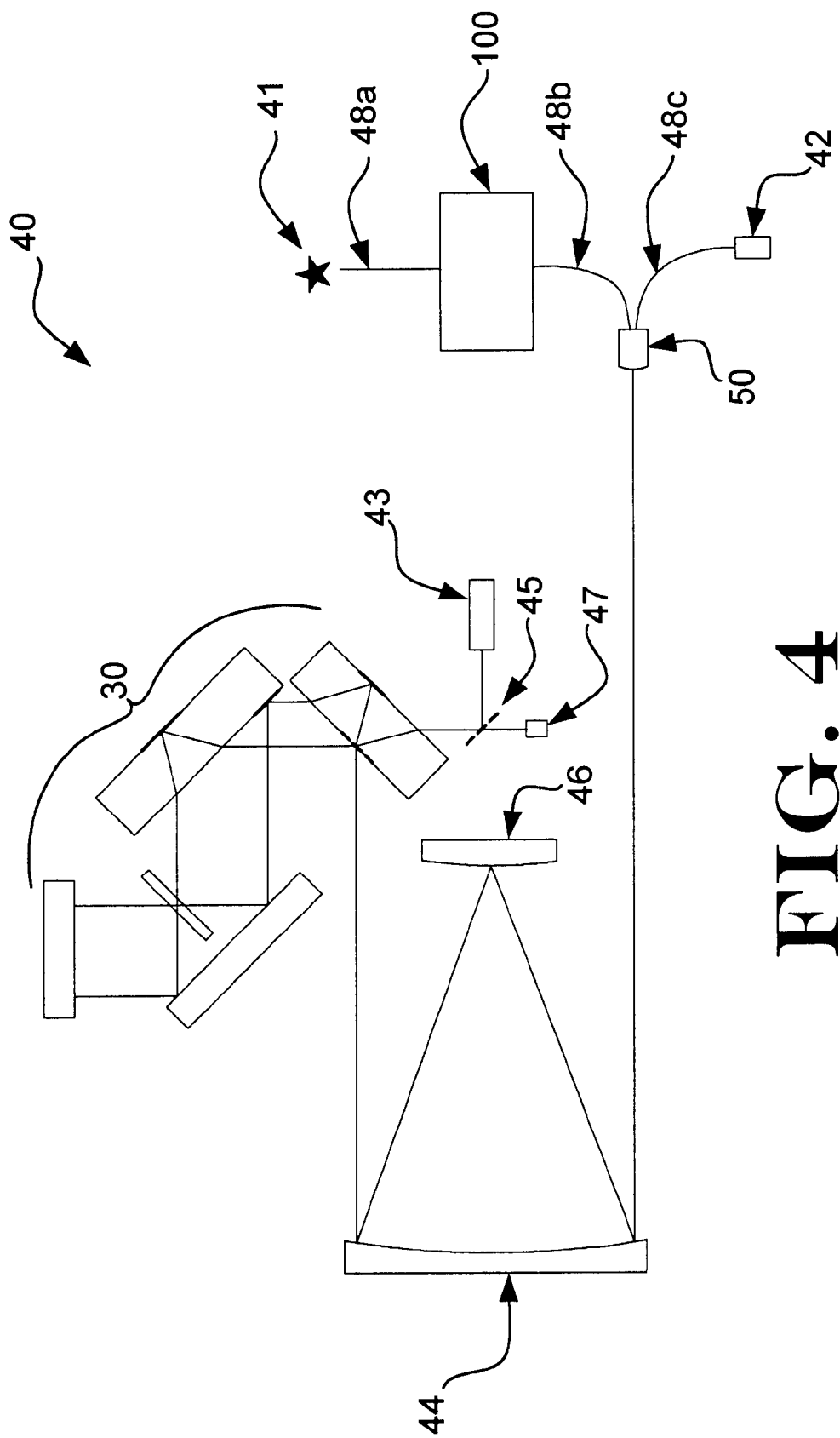
FIG. 4 is a schematic diagram illustrating an example of an optical system incorporating the interferometer of the third embodiment in accordance with the present invention.

Refer now to FIG. 4, which illustrates a schematic diagram of an optical system 40 incorporating the interferometer 30 in accordance with the present invention. Optical system 40 incorporates a unit magnification relay design which is used to image the exit pupil of the collimator lens 50 onto the surface of the end mirror 16. The unit magnification relay design minimizes the size of the critical interferometer components by minimizing the beam diameter throughout the system 40. Those skilled in the art will recognize that many unit magnification relay designs may be utilized, including both reflecting and refracting type designs known in the art. For purposes of illustration only, the relay used in the optical system 40 includes two primary components, namely a concave mirror 44 and a convex mirror 46. This relay arrangement is described in detail by Offner in an article entitled "New Concepts In Projection Mask Liners," Opt. Eng., 14:131 (1975).

Optical system 40 further includes an OPD reference subsystem including laser 43, beam splitter 45, and detector 47. In use, the laser 43 and the detector 47 are slightly offset from each other on opposite sides of the optical axis in order to prevent laser energy feedback after the laser passes through the interferometer 30.

Optical system 40 further includes a light source 41 and a light detector 42. The light source 41 includes an incandescent lamp which is optically coupled by fiber bundle 48a to the sample 100 to be tested. Specific methods of optically coupling the sample 100 for purposes of measuring blood constituents are described in U.S. Pat. No. 5,355,880 and 5,830,132, the entire disclosures of which are hereby incorporated by reference. Fiber bundle 48b is positioned in the focal plane of collimator lens 50 to provide an input ray. Fiber bundle 48c is positioned in the focal plane of collimator lens 50 to collect an output ray from the interferometer 30 and transmit the output ray to the detector 42. Thus, optical system 40 demonstrates how the interferometer 30, in addition to interferometers 10 and 20, may be utilized as spectrometers.

Figures 5A, 5B:
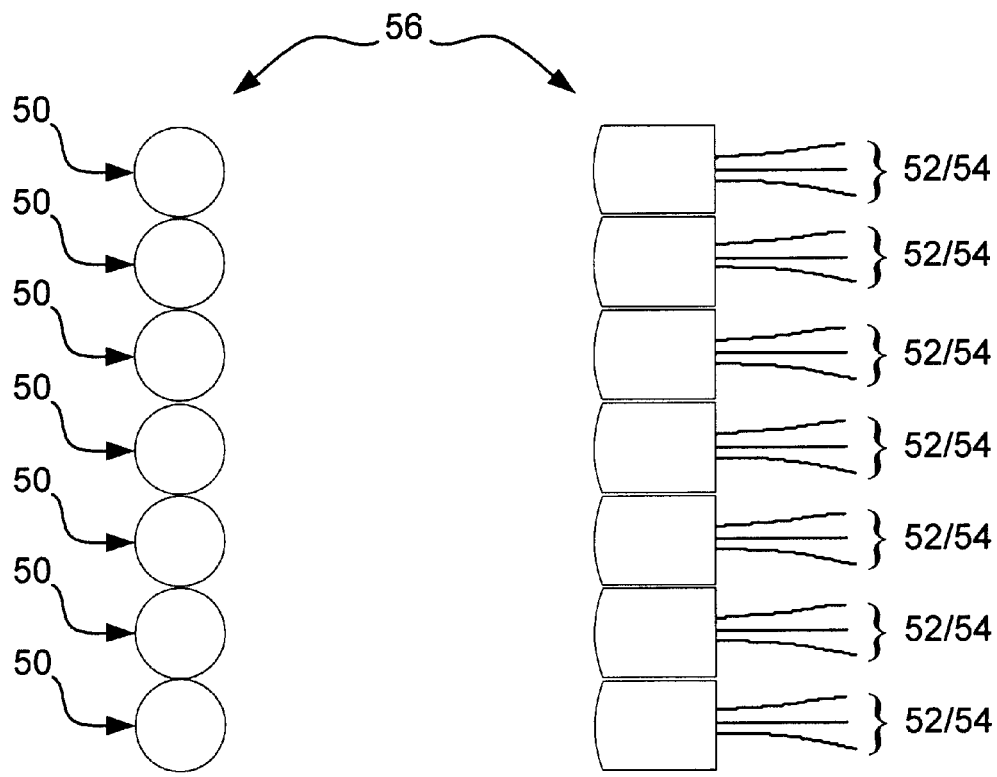
FIG. 5A is a front view of an array of collimator lenses in accordance with the present invention.
FIG. 5B is a side view of the array of collimator lenses illustrated in FIG. 5A.
Figure 5C:
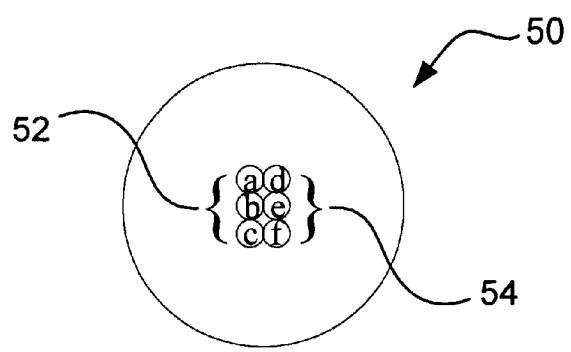
FIG. 5C is a rear view of an individual collimator lens in the array of collimator lenses illustrated in FIG. 5A.

Refer now to FIGS. 5A through 5C which illustrate various views of a collimator lens 50 and an array 56 of collimator lenses 50 in accordance with the present invention. As mentioned previously, in order to optimize the throughput of interferometer 30, it is preferable to use a light source that produces an elliptical FOV. Collimator lens 50 and/or array 56 may be used to generate an elliptical FOV.

Allowable field-of-view (FOV) of the interferometer is the maximum angular subtense of the light source, viewed through the interferometer, for which all rays collected from the light source, having traveled one of the two paths through the interferometer, have an OPD relative to each other of less than or equal to one half the wavelength of the light being measured. This definition applies at all retardation values up to the retardation required to achieve the desired instrument spectral resolution. The allowable optical throughput is the optical throughput utilizing the allowable field-of-view as defined above. The terms maximum angular subtense and allowable field-of-view are interchangeable. The angular subtense of the light source is measured as the angle the ray makes with an axis defined as the average direction of propagation of all input rays. For the designs of the current invention, it is found that the maximum angular subtense allowed by the interferometer varies as a function of the azimuthal angle; i.e., the angle of the ray projected onto a plane perpendicular to the direction of propagation. The shape of this function is, in general, elliptical.

With specific reference to FIG. 5C which illustrates a rear view of an individual collimator lens 50, a total of six optical fibers a, b, c, d, e, and f are positioned in the collimator focal plane. Fibers a, b, and c are transmit fibers 52, and fibers d, e, and f are receiver fibers 54. The fibers are positioned such that light emitted from fiber a is collected by fiber f; light emitted from fiber b is collected by fiber e; and light emitted from fiber c is collected by fiber d. Transmitting fiber array 52 corresponds to fiber bundle 48b and receiving fiber array 54 corresponds to fiber bundle 48c, as illustrated in FIG. 4.

With this arrangement, the FOV in the vertical direction is three times the FOV in the horizontal position. Although a 3:1 ratio of fibers is illustrated, those skilled in the art will recognize that other ratios may be used as well. For example, it was determined that for the working model of interferometer 30 as incorporated into optical system 40, the optimum ratio was approximately 4.6:1. Generally, an array of transmitting fibers 52 disposed adjacent an array of receiving fibers 54 having a ratio greater than 1:1 will result in an elliptical FOV.

In order to provide a side-by-side arrangement of transmitting fibers 52 adjacent receiving fibers 54 as illustrated in FIG. 5C, the transmitting fibers 52 must be separated from the receiving fibers 54 by a small angle. For example, for the working model of interferometer 30 as incorporated into optical system 40, the transmitting fibers 52 were separated from the receiving fibers 54 by an angle of approximately 2.8 degrees. This angular separation may be eliminated by using path AB for the input and path CN for the output, or visa versa, as described previously.

Refer now to FIGS. 5A and 5B which illustrate an array 56 of individual collimator lenses 50 arranged in a parallel column. Each of the collimator lenses 50 of the array 56 may be constructed as described with reference to FIG. 5C. Specifically, each collimator lens 50 in the array 56 may include a plurality of transmitting fibers 52 disposed adjacent a plurality of receiving fibers 54. For multichannel operation, the transmitting fibers and the receiving fibers of each channel may go to separate light sources and separate light detectors. Alternatively, all of the transmitting fibers may be connected to a single light source and all of the receiving fibers may be connected to a single light detector for single channel operation. The arrangement of a plurality of collimator lenses 50 in an array 56 provides a more compact design than would be accomplished utilizing a single collimator lens of equivalent area for single channel use.

The multi-channel use as permitted by array 56 is particularly useful when multiple samples 100 are presented simultaneously for analysis. For example, process monitoring of a wide strip of material, where the linear array 56 is set up perpendicular to the direction of the feed of the material, permits the interferometer to detect variations along the width of the material. In addition, simultaneous analysis of a number of samples with properties that change with time is made possible by multichannel array 56. Further, multichannel array 56 provides increased measurement throughput in situations here samples are available only for a specific period of time, such as on a conveyor which indexes samples to a new position at specific time intervals. In this situation, throughput is increased by placing samples in parallel across the conveyor to line up with the individual lenses 50 of the array 56. In sum, the array 56 optimizes the shape and size of the collimated beam used in the interferometer 30, thereby allowing the interferometer 30 component shape and size to be optimized for minimum production cost and maximum size reduction.

From the foregoing, it should be apparent to the reader that the present invention provides a number of interferometer designs that provide interferometer spectrometers with improved performance and ease of manufacture. The interferometers of the present invention have greatly reduced sensitivity to alignment errors of the individual components as compared to prior art interferometers. This allows calibration to be maintained even under conditions in which small changes in angle and position of the individual components occur. The practical advantages of this feature are that the component mounts may be simplified thereby reducing manufacturing costs and that the interferometer is more robust and compact, and thus more suitable for a portable application.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. An interferometer spectrometer, comprising:
    a beam splitter for splitting an input ray into a first ray and a second ray having a first path and a second path, the first ray and the second ray exiting the beam splitter in parallel;
    a means for redirecting the first and second rays back toward the beam splitter to define a first path length and a second path length, respectively, the first ray and the second ray striking the redirecting means in parallel; and
    a means for generating a difference between the first and second path lengths,
        wherein the first ray and the second ray optically interact with the beam splitter, the redirecting means, and the means for generating a path length difference.

2. An interferometer spectrometer as in claim 1, wherein the beam splitter combines the redirected first and second rays into an output ray pair, and wherein the rays forming the output ray pair are parallel.

3. An interferometer spectrometer as in claim 2, wherein translational and rotational changes in relative position between the beam splitter, the redirecting means, and the means for generating a path length difference do not result in a lack of parallelism between the rays forming the output ray pair.

4. An interferometer spectrometer as in claim 3, wherein translational changes in relative position between the beam splitter, the redirecting means, and the means for generating a path length difference do not result in a lateral separation of the rays forming the output ray pair.

5. An interferometer spectrometer as in claim 4, wherein there is no lateral separation of the rays forming the output ray pair when the first and second rays strike the redirecting means at normal incidence.

6. An interferometer spectrometer as in claim 1, wherein the beam splitter has flat and parallel leading and trailing surfaces with homogenous refractive material disposed therebetween.

7. An interferometer spectrometer as in claim 6, further comprising a compensator disposed between the beam splitter and the redirecting means for equalizing the optical path lengths of the first and second paths, the compensator having flat and parallel leading and trailing surfaces with homogenous refractive material disposed therebetween.

8. An interferometer spectrometer, as in claim 6, wherein the beam splitter and the compensator form an angle of intersection, and wherein the angle of intersection is greater than zero degrees.

9. An interferometer spectrometer as in claim 6, wherein the path length difference generating means comprises rotation of the beam splitter, the redirecting means, or the compensator.

10. An interferometer spectrometer as in claim 9, wherein the path length difference generating means comprises rotation of the beam splitter.

11. An interferometer spectrometer as in claim 9, wherein the path length difference generating means comprises rotation of the redirecting means.

12. An interferometer spectrometer as in claim 9, wherein the path length difference generating means comprises rotation of the compensator.

13. An interferometer spectrometer as in claim 1, further comprising a scanner plate of refractive material having parallel sides.

14. An interferometer spectrometer as in claim 13, wherein the path length difference generating means comprises rotation of the scanner plate.

15. An interferometer spectrometer, as in claim 1, wherein the rays forming the output ray pair produce an elliptical angular subtense within the allowable field of view.

16. An interferometer spectrometer, as in claim 1, wherein the rays forming the output ray pair have a maximum vertical angular subtense different from a maximum horizontal angular subtense within the allowable field of view.

17. An optical system, comprising:
an interferometer spectrometer as in claim 1;
a light source generating the input ray, the light source optically connected the interferometer;
a means for introducing one or more test samples into the input ray, the introducing means disposed between the light source and the interferometer; and
a light collector for receiving the output ray pair, the light collector optically connected the interferometer.

18. An interferometer spectrometer, comprising:
a beam splitter for splitting an input ray into a first ray and a second ray having a first path and a second path, the beam splitter having flat and parallel leading and trailing surfaces with homogenous refractive material disposed therebetween;
a flat end mirror terminating the first path and the second path to define a first path length and a second path length, respectively, wherein the end mirror reflects the first and second rays back to the beam splitter to combine the rays into an output ray pair, wherein the rays forming the output ray pair are parallel;
a compensator disposed between the beam splitter and the end mirror for equalizing the optical path lengths of the first and second paths, the compensator having flat and parallel leading and trailing surfaces with homogenous refractive material disposed therebetween; and
a means for generating a difference between the first and second path lengths to create an interference pattern in the output ray pair, wherein the path length difference generating means is common to both the first and second paths.

19. An interferometer spectrometer as in claim 18, wherein translational and rotational changes in relative position between the beam splitter, the compensator and the end mirror do not result in a lack of parallelism between the rays forming the output ray pair.

20. An interferometer spectrometer as in claim 18, wherein there is no lateral separation of the rays forming the output ray pair when the first and second rays strike the end mirror at normal incidence.

21. An interferometer spectrometer as in claim 18, wherein translational changes in relative position between the beam splitter, the compensator and the end mirror do not result in a lateral separation of the rays forming the output ray pair.

22. An interferometer spectrometer as in claim 18, wherein the input ray is provided by a light source, and wherein the light source produces an elliptical angular subtense.

23. An interferometer spectrometer as in claim 22, wherein the light source includes a collimator lens having an array of transmitting optical fibers disposed adjacent an array of receiving optical fibers.

24. An interferometer spectrometer as in claim 23, wherein the lenses are arranged in parallel.

25. An interferometer spectrometer as in claim 22, wherein a single channel is utilized.

26. An interferometer spectrometer as in claim 22, wherein multiple channels are utilized.

27. An interferometer spectrometer, comprising:
a beam splitter for splitting an input ray into a first ray and a second ray having a first path and a second path, the beam splitter comprising a plate having flat and parallel surfaces;
a flat end mirror terminating the first path and the second path to define a first path length and a second path length, respectively, wherein the end mirror reflects the first and second rays back to the beam splitter to combine the rays into an output ray pair, wherein the rays forming the output ray pair are parallel;
a compensator disposed between the beam splitter and the end mirror for equalizing the optical path lengths of the first and second paths, the compensator comprising a plate having flat and parallel surfaces; and
a means for generating a difference between the first and second path lengths to create an interference pattern in the output ray pair, wherein the path length difference generating means is common to both the first and second paths;
wherein translational changes in relative position between the beam splitter, the compensator and the end mirror do not result in a lack of parallelism or a lateral separation between the rays forming the output ray pair.

28. An interferometer spectrometer, comprising:
a beam splitter for splitting an input ray into a first ray and a second ray having a first path and a second path, respectively;
an end mirror terminating the first path and the second path to define a first path length and a second path length, respectively, wherein the end mirror reflects the first and second rays back to the beam splitter along the first and second paths, respectively, to combine the rays into an output ray pair;
a compensator disposed between the beam splitter and the end mirror for equalizing the optical path lengths of the first and second paths; and
a means for generating a difference between the first and second path lengths to create an interference pattern in the output ray pair, the path length difference generating means disposed in the first and second paths such that the first and second rays pass therethrough.

29. An interferometer spectrometer as in claim 28, wherein translational and rotational changes in relative position between the beam splitter, the compensator and the end mirror do not result in a lack of parallelism between the rays forming the output ray pair.

30. An interferometer spectrometer as in claim 29, wherein translational changes in relative position between the beam splitter, the compensator and the end mirror do not result in a lateral separation of the rays forming the output ray pair.

31. An interferometer spectrometer as in claim 28, wherein translational changes in relative position between the beam splitter, the compensator and the end mirror do not result in a lateral separation of the rays forming the output ray pair.

32. An interferometer spectrometer as in claim 28, further comprising a scanner plate of refractive material having parallel sides.

33. An interferometer spectrometer as in claim 32, wherein the scanner plate is disposed in both of the first and second paths.

34. An interferometer spectrometer as in claim 33, wherein the first and second paths intersect at an intersection point, and wherein the scanner plate is disposed at the intersection point.

35. An interferometer spectrometer as in claim 34, further comprising:
an intersection mirror for causing the first and second paths to intersect at the intersection point, the intersection mirror disposed between the beam splitter and the end mirror.

36. An interferometer spectrometer as in claim 28, wherein the path length difference generating means comprises rotation of the beam splitter.

37. An interferometer spectrometer as in claim 28, wherein the path length difference generating means comprises rotation of the compensator.

38. An interferometer spectrometer as in claim 32, wherein the path length difference generating means comprises rotation the scanner.

39. An interferometer spectrometer as in claim 28, wherein the input ray is provided by a light source, and wherein the light source produces an elliptical angular subtense.

40. An interferometer spectrometer as in claim 39, wherein the light source includes a collimator lens having an array of transmitting fibers disposed adjacent an array of receiving fibers.

41. An interferometer spectrometer as in claim 39, wherein the light source includes a plurality of collimator lenses each having an array of transmitting fibers disposed adjacent an array of receiving fibers.

42. An interferometer spectrometer as in claim 41, wherein the lenses are arranged in parallel.

43. An interferometer spectrometer as in claim 39, wherein a single channel is utilized.

44. An interferometer spectrometer as in claim 39, wherein multiple channels are utilized.

45. An interferometer spectrometer, comprising:
a beam splitter comprising a block of refractive material having parallel first and second surfaces, the second surface having a partially reflective material thereon for splitting an input ray into a first ray and a second ray having a first path and a second path, respectively, the first surface having a reflective material thereon for reflecting the first ray such that the first and second rays exit the beam splitter in parallel;
an end mirror terminating the first path and the second path to define a first path length and a second path length, respectively, wherein the end mirror reflects the first and second rays back to the beam splitter along the first and second paths, respectively, to combine the rays into an output ray pair;
a compensator comprising a plate of refractive material having parallel sides, the compensator disposed between the beam splitter and the end mirror for equalizing the optical path lengths of the first and second paths; and
a means for generating a difference between the first and second path lengths to create an interference pattern in the output ray pair, wherein the path length difference generating means is common to both the first and second paths.

46. An interferometer spectrometer as in claim 45, wherein translational and rotational changes in relative position between the beam splitter, the compensator and the end mirror do not result in a lack of parallelism between the rays forming the output ray pair.

47. An interferometer spectrometer as in claim 46, wherein translational changes in relative position between the beam splitter, the compensator and the end mirror do not result in a lateral separation of the rays forming the output ray pair.

48. An interferometer spectrometer as in claim 45, wherein translational changes in relative position between the beam splitter, the compensator and the end mirror do not result in a lateral separation of the rays forming the output ray pair.

49. An interferometer spectrometer as in claim 45, further comprising a scanner plate of refractive material having parallel sides.

50. An interferometer spectrometer as in claim 49, wherein the first and second paths intersect at an intersection point, and wherein the scanner plate is disposed at the intersection point.

51. An interferometer spectrometer as in claim 50, further comprising:
an intersection mirror for causing the first and second paths to intersect at the intersection point, the intersection mirror disposed between the beam splitter and the end mirror.

52. An interferometer spectrometer as in claim 45, wherein the path length difference generating means comprises rotation of the beam splitter.

53. An interferometer spectrometer as in claim 45, wherein the path length difference generating means comprises rotation of the compensator.

54. An interferometer spectrometer as in claim 49, wherein the path length difference generating means comprises rotation the scanner plate.

55. An interferometer spectrometer, comprising:
a beam splitter comprising a plate of refractive material having parallel leading and trailing surfaces, the trailing surface having a partially reflective material thereon for splitting an input ray into a first ray and a second ray having a first path and a second path, respectively, the leading surface having a reflective material thereon for reflecting the first ray such that the first and second rays exit the beam splitter in parallel;
an end mirror terminating the first path and the second path to define a first path length and a second path length, respectively, wherein the end mirror reflects the first and second rays back to the beam splitter along the first and second paths, respectively, to combine the rays into an output ray pair;
a compensator plate of refractive material having parallel sides for equalizing the amount of refractive material in the first and second paths, the compensator plate disposed between the beam splitter and the end mirror;
an intersection mirror for causing the first and second paths to intersect at an intersection point, the intersection mirror disposed between the compensator and the end mirror; and
a scanner plate of refractive material having parallel sides for generating a difference between the first and second path lengths to create an interference pattern in the output ray pair, the scanner plate disposed at the intersection point.

56. An interferometer spectrometer as in claim 55, wherein translational and rotational changes in relative position between the beam splitter, the compensator and the end mirror do not result in a lack of parallelism between the rays forming the output ray pair.

57. An interferometer spectrometer as in claim 56, wherein translational changes in relative position between the beam splitter, the compensator and the end mirror do not result in a lateral separation of the rays forming the output ray pair.

58. An interferometer spectrometer as in claim 55, wherein translational changes in relative position between the beam splitter, the compensator and the end mirror do not result in a lateral separation of the rays forming the output ray pair.

59. An interferometer spectrometer, comprising:

a light source including an array of collimator lenses defining an elliptical angular subtense;

a beam splitter for splitting the input ray into a first ray and a second ray having a first path and a second path, respectively;

an end mirror terminating the first and second paths to define a first path length and a second path length, respectively;

a compensator disposed between the beam splitter and the end mirror for equalizing the optical path lengths of the first and second paths; and a means for generating a difference between the first and second path lengths.

60. An interferometer spectrometer as in claim 59, wherein each collimator lens has an array of transmitting fibers disposed adjacent an array of receiving fibers.

61. An interferometer spectrometer as in claim 59, wherein the lenses are arranged in parallel.

62. An interferometer spectrometer as in claim 61, wherein a single channel is utilized.

63. An interferometer spectrometer as in claim 61, wherein multiple channels are utilized.

* * * * *